US010099520B2

United States Patent
Yu et al.

(10) Patent No.: US 10,099,520 B2
(45) Date of Patent: Oct. 16, 2018

(54) ANTENNA MATCHING DEVICE FOR DUAL-FREQUENCY TIRE PRESSURE DETECTOR

(71) Applicant: CUB ELECPARTS INC., Changhua County (TW)

(72) Inventors: San-Chuan Yu, Changhua County (TW); Tsan-Nung Wang, Changhua County (TW); Tzu-Wen Ko, Changhua County (TW); Jyong Lin, Changhua County (TW); Hsiao-Ming Chen, Changhua County (TW)

(73) Assignee: CUB ELECPARTS INC., Changhua County (TW)

( * ) Notice: Subject to any disclaimer, the term of this patent is extended or adjusted under 35 U.S.C. 154(b) by 0 days.

(21) Appl. No.: 15/497,702

(22) Filed: Apr. 26, 2017

(65) Prior Publication Data
US 2018/0229559 A1 Aug. 16, 2018

(30) Foreign Application Priority Data
Feb. 16, 2017 (TW) .............................. 106105102 A

(51) Int. Cl.
*H04B 1/04* (2006.01)
*B60C 23/04* (2006.01)

(52) U.S. Cl.
CPC ....... *B60C 23/0433* (2013.01); *H04B 1/0458* (2013.01)

(58) Field of Classification Search
CPC ... B60C 23/0433; B60C 23/00; B60C 23/001; B60C 23/002; B60C 23/003; B60C 23/004; B60C 23/005; B60C 23/02; B60C 23/04; B60C 23/0408; B60C 23/0422; B60C 23/0427; B60C 23/043; B60C 23/0432; B60C 23/0435; B60C 23/0438; B60C 23/0444; H04B 1/0458; G01L 17/00; G01L 17/005
See application file for complete search history.

(56) References Cited

U.S. PATENT DOCUMENTS

| | | | |
|---|---|---|---|
| 2014/0194075 A1* | 7/2014 | Black ....................... | H04B 1/40 455/77 |
| 2014/0306815 A1* | 10/2014 | Henriet ............... | B60C 23/0455 340/447 |
| 2015/0180514 A1* | 6/2015 | Pavacic ................ | H04B 1/0064 455/552.1 |

* cited by examiner

*Primary Examiner* — Brian Wilson
(74) *Attorney, Agent, or Firm* — Muncy, Geissler, Olds & Lowe, P.C.

(57) ABSTRACT

An antenna matching device for a dual-frequency tire pressure detector includes: a microcontroller having a control pin; a dual-frequency signal unit controlled by the microcontroller to which one of two different frequency signals to generate; and a matching unit having an input end, two external pins, and an output end, the input end being electrically connected to the dual-frequency signal unit to receive the frequency signals from the dual-frequency signal unit, the external pins being electrically connected to two ends of a diode, respectively, with the control pin electrically connected to one of the external pins, and the output end being electrically connected to an antenna, wherein the matching unit provides two impedances between the input end and the output end so that the microcontroller controls an operating state of the diode according to whether the control pin is grounded, thereby switching between the impedances of the matching unit.

4 Claims, 2 Drawing Sheets

ANTENNA MATCHING DEVICE FOR DUAL-FREQUENCY TIRE PRESSURE DETECTOR

BACKGROUND OF THE INVENTION

1. Field of the Invention

The present invention relates to tire pressure detector and, more particularly, to an antenna matching device for a dual-frequency tire pressure detector.

2. Description of the Prior Art

Conventional tire pressure detectors come in two frequency-related specifications, that is, either operating at 315 MHz or operating at 433.92 MHz, depending on the receiving frequency of a vehicular host. Those tire pressure detectors configured to operate at 315 MHz are not applicable to a vehicular host operating at 433.92 MHz, and vice versa. In view of this, if a tire pressure detector is allowed to choose its operating frequency and thus applicable to different vehicular hosts, the tire pressure detector will be popular with consumers.

US 2014/0306815 A1 discloses a multi-frequency tire pressure detector, and specifically discloses in FIG. 2 effectuating frequency adjustment by phase locked loop (PLL) technology and providing a related control function with a microcontroller 250, wherein, after a phase locked loop (PLL) 270 has generated a signal of a predetermined frequency under the control of the microcontroller 250, the signal is transmitted respectively to two RF matching circuits 220, 225 at the back end according to the frequency of the signal, and in consequence the circuit which matches the signal sends the signal to an antenna 230 wirelessly. FIG. 3 of US 2014/0306815 A1 shows the fine structures between the PLL and the two matching circuits. US 2014/0306815 A1 discloses in paragraphs [0026]~[0029] operating at 315 MHz and 433.92 MHz selectively, and selecting a matching circuit, and discloses in paragraph [0029] using a programmable logic function 330 to open or close a first switch 335 and/or a second switch 340, so as to select a matching circuit.

An antenna must match an RF frequency in order to effectively send a signal. Hence, US 2014/0306815 A1 discloses in FIG. 2: a technology of enabling an antenna to match different frequencies; the two RF matching circuits 220, 225 correspond to signals of different frequencies and thus match the same antenna 230; and the PLL (phase locked loop) 270 provides a signal and selects an RF matching circuit. However, the prior art does not disclose allowing the same matching device to match signals of different frequencies with the same antenna.

SUMMARY OF THE INVENTION

It is an objective of the present invention to provide an antenna matching device for a dual-frequency tire pressure detector, allowing the same matching device to match signals of different frequencies with the same antenna.

In order to achieve the above and other objectives, the present invention provides an antenna matching device for a dual-frequency tire pressure detector, comprising: a microcontroller having a control pin; a dual-frequency signal unit capable of generating two different frequency signals, electrically connected to the microcontroller, and thus controlled by the microcontroller to determine which one of the frequency signals to generate; and a matching unit having an input end, two external pins, and an output end, the input end being electrically connected to the dual-frequency signal unit to receive the frequency signals generated from the dual-frequency signal unit, the two external pins being electrically connected to two ends of a diode, respectively, with the control pin electrically connected to one of the two external pins, and the output end being electrically connected to an antenna, wherein the matching unit provides two different impedances between the input end and the output end so that the microcontroller controls an operating state of the diode according to whether the control pin is grounded, thereby switching between the impedances of the matching unit.

Therefore, according to the present invention, the microcontroller controls an open circuit or a closed circuit between the two external pins and thus changes the impedance of the matching unit, thereby allowing the same matching device to match signals of different frequencies with the same antenna.

DETAILED DESCRIPTION OF THE EMBODIMENT OF THE INVENTION

The technical features of the present invention are illustrated by a preferred embodiment, depicted by drawings, and described below.

Figure 1:
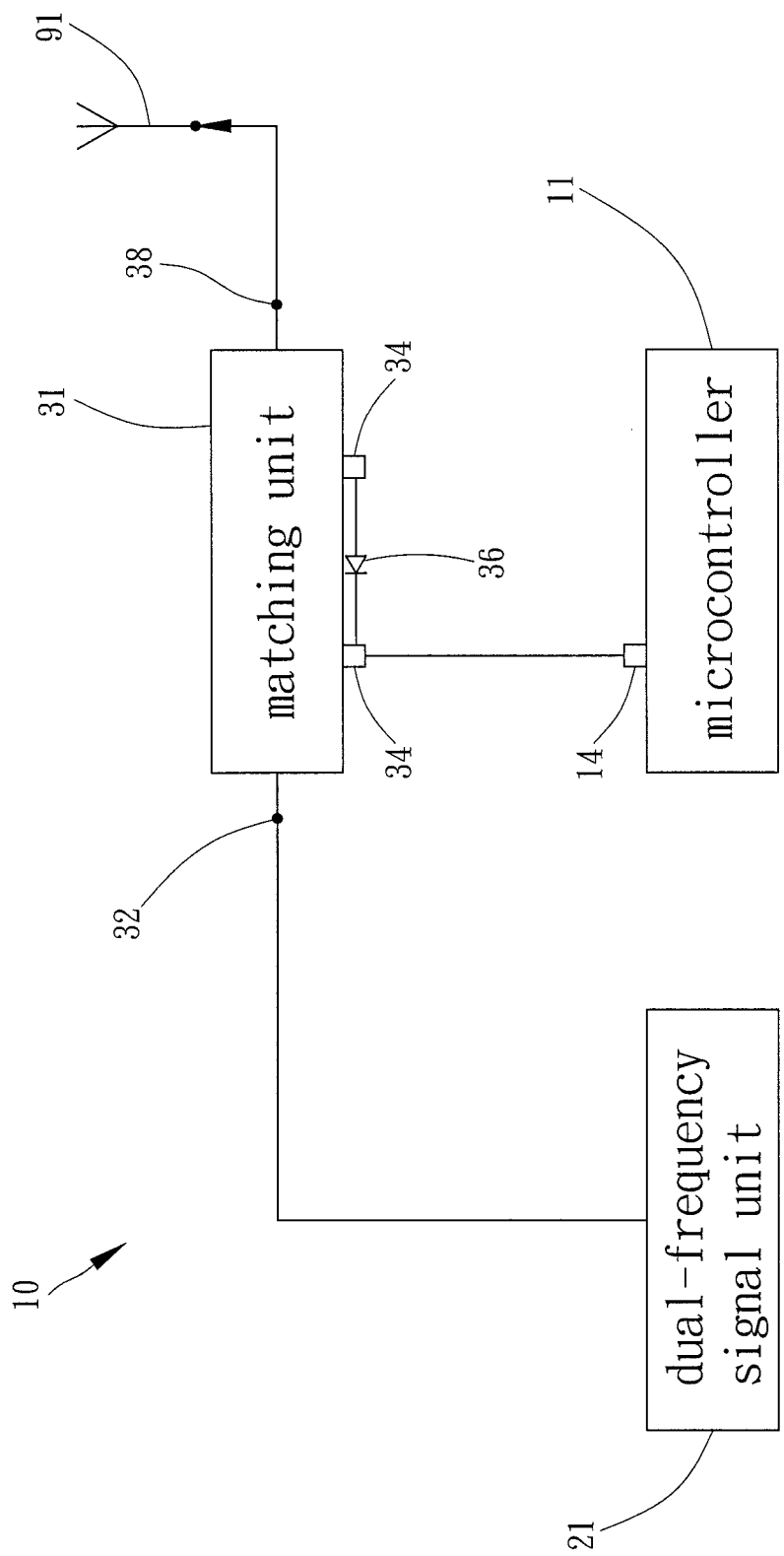
FIG. 1 is a block diagram of an antenna matching device for a dual-frequency tire pressure detector according to a preferred embodiment of the present invention.

Referring to FIG. 1, according to a preferred embodiment of the present invention, an antenna matching device 10 for a dual-frequency tire pressure detector essentially comprises a microcontroller 11, a dual-frequency signal unit 21, and a matching unit 31.

The microcontroller 11 has a control pin 14.

The dual-frequency signal unit 21 is capable of generating two different frequency signals. The dual-frequency signal unit 21 is electrically connected to the microcontroller 11 and controlled by the microcontroller 11 to determine one of the two different frequency signals to generate.

The matching unit 31 has an input end 32 electrically connected to the dual-frequency signal unit 21 and adapted to receive the frequency signals generated from the dual-frequency signal unit 21. The matching unit 31 has two external pins 34 electrically connected to two ends of a diode 36, respectively. One of the two external pins 34 is electrically connected to the control pin 14. The matching unit 31 has an output end 38 electrically connected to an antenna 91. In this embodiment, the diode 36 is a PIN diode or a varactor diode.

Figure 2:
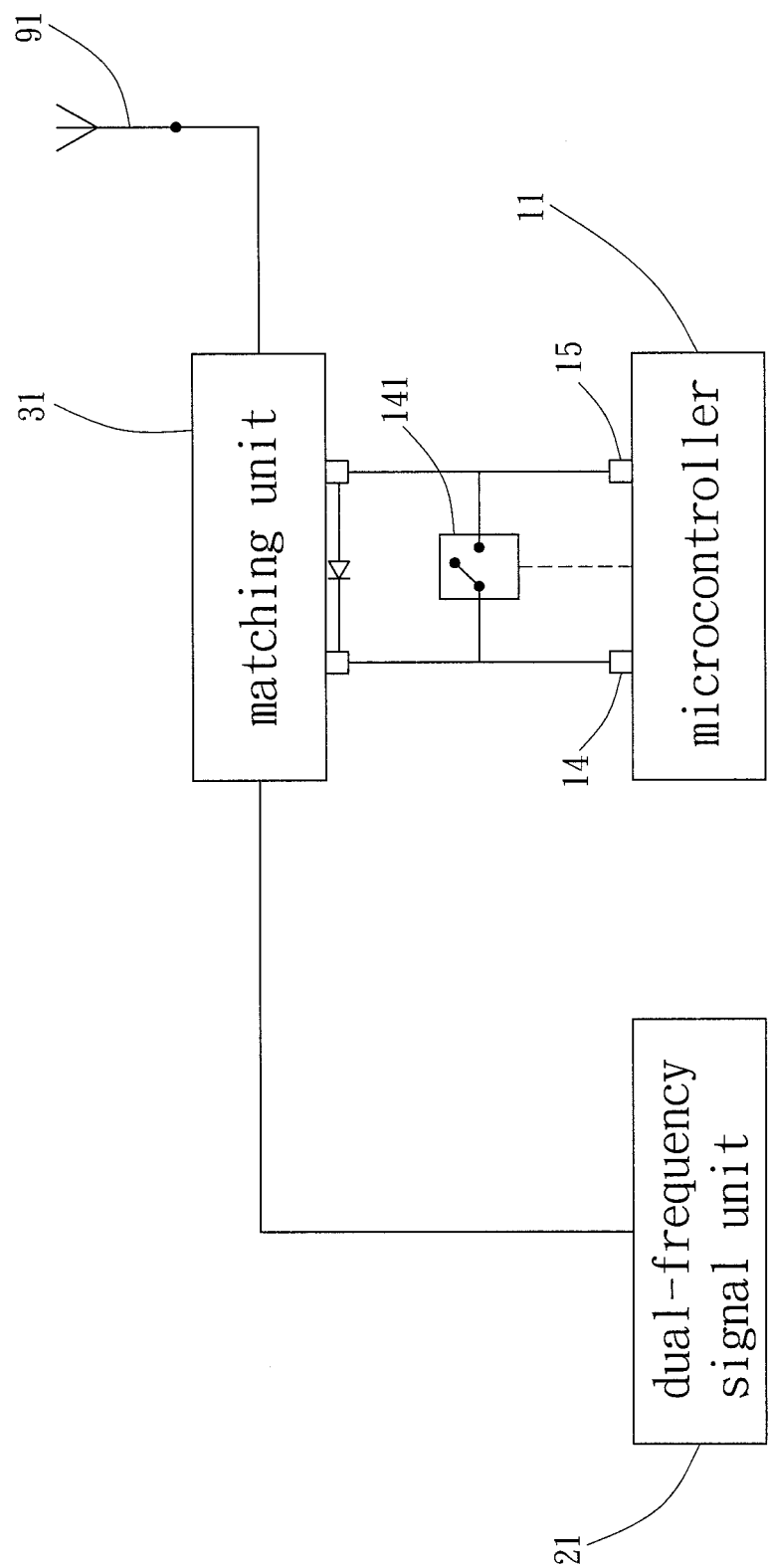
FIG. 2 is another block diagram of the antenna matching device for a dual-frequency tire pressure detector according to a preferred embodiment of the present invention.

The matching unit 31 provides two different impedances between the input end 32 and the output end 38. The microcontroller 11 controls the operating state of the diode 36 according to whether the control pin 14 is grounded, thereby switching between the impedances of the matching unit 31. In practice, the microcontroller 11 directly controls the control pin 14 to be grounded or not to be grounded. Referring to FIG. 2, the microcontroller 11 further has a ground pin 15, and the ground pin 15 is electrically connected to one said external pin 34 which is not electrically connected to the control pin 14. An electrically controlled switch 141 is disposed between the control pin 14 and the ground pin 15. The electrically controlled switch 141 is electrically connected to the microcontroller 11 and thus controlled by the microcontroller 11 to create a short circuit or an open circuit, thereby grounding the control pin 14 as soon as the short circuit is created.

The framework of this embodiment is described above. The operating state of this embodiment is described below.

Referring to FIG. 1, to allow the antenna 91 to match the signal of the first frequency of the two frequencies, it is feasible for the microcontroller 11 to control the first-frequency signal generated from the dual-frequency signal unit 21 so that the microcontroller 11 inhibits the grounding of the control pin 14; hence, the current between the two external pins 34 can be conducted by the diode 36 in one direction but not the other to allow the matching unit 31 to provide a first impedance between the input end 32 and the output end 38, thereby allowing the signal of the first frequency to match the antenna 91. To allow the signal of the second frequency of the two frequencies to match the antenna 91, it is feasible for the microcontroller 11 to control the second-frequency signal generated from the dual-frequency signal unit 21 so that the microcontroller 11 controls the control pin 14 to be grounded; hence, the current between the two external pins 34 is not susceptible to the diode 36 to allow the matching unit 31 to provide a second impedance between the input end 32 and the output end 38, thereby allowing the signal of the second frequency to match the antenna 91.

Therefore, according to the present invention, it is feasible to change the impedance of the matching unit 31 according to whether the control pin 14 of the microcontroller 11 is grounded, thereby allowing the same matching device to match signals of different frequencies with the same antenna 91.

What is claimed is:

1. An antenna matching device for a dual-frequency tire pressure detector, comprising:
   a microcontroller having a control pin;
   a dual-frequency signal unit configured to generate two different frequency signals, electrically connected to the microcontroller, and thus controlled by the microcontroller to determine which one of the two different frequency signals to generate; and
   a matching unit having an input end, two external pins, and an output end, the input end being electrically connected to the dual-frequency signal unit to receive the two different frequency signals generated from the dual-frequency signal unit, the two external pins being electrically connected to two ends of a diode, respectively, with the control pin electrically connected to one of the two external pins, and the output end being electrically connected to an antenna,
   wherein the matching unit provides a first impedance and a second impedance between the input end and the output end so that the microcontroller controls an operating state of the diode according to whether the control pin is grounded, thereby switching between the first and second impedances of the matching unit; the microcontroller inhibits the grounding of the control pin to control a first frequency signal of the two different frequency signals generated from the dual-frequency signal unit, such that current between the two external pins is conducted by the diode in one direction to allow the matching unit to provide the first impedance between the input end and the output end; and
   the microcontroller controls the control pin to be grounded to control a second frequency signal of the two different frequency signals generated from the dual-frequency signal unit, such that the current between the two external pins is not susceptible to the diode to allow the matching unit to provide the second impedance between the input end and the output end.

2. The antenna matching device for the dual-frequency tire pressure detector in accordance with claim 1, wherein the microcontroller further has a ground pin, and one of the two external pins is not electrically connected to the control pin but is electrically connected to the ground pin.

3. The antenna matching device for the dual-frequency tire pressure detector in accordance with claim 2, wherein an electrically controlled switch is disposed between the control pin and the ground pin, electrically connected to the microcontroller, and thus controlled by the microcontroller to create a short circuit or an open circuit, thereby grounding the control pin as soon as the short circuit is created.

4. The antenna matching device for the dual-frequency tire pressure detector in accordance with claim 1, wherein the diode is one of a PIN diode and a varactor diode.

* * * * *